United States Patent [19]

Kiefer

[11] 4,084,891
[45] Apr. 18, 1978

[54] SOUND MOTION-PICTURE CAMERA

[75] Inventor: Hans-Friedrich Kiefer, Stuttgart, Germany

[73] Assignee: Robert Bosch GmbH, Stuttgart, Germany

[21] Appl. No.: 694,194

[22] Filed: Jun. 9, 1976

[30] Foreign Application Priority Data

Jul. 5, 1975 Germany .............................. 2530134

[51] Int. Cl.² ............................................ G03B 31/00
[52] U.S. Cl. ...................................... 352/22; 352/25; 352/27; 352/174
[58] Field of Search ...................... 352/22, 25, 27, 29, 352/30, 31, 174, 176, 180

[56] References Cited

U.S. PATENT DOCUMENTS

| 2,031,836 | 2/1936 | Kellogg | 352/25 |
| 2,208,404 | 7/1940 | Aalberg | 352/25 |
| 3,879,114 | 4/1975 | Stenzenberger | 352/29 |
| 3,905,691 | 9/1975 | Floden | 352/29 |
| 3,984,179 | 10/1976 | Krumbein | 352/27 |

*Primary Examiner*—Monroe H. Hayes
*Attorney, Agent, or Firm*—Michael J. Striker

[57] ABSTRACT

The camera includes a drive arrangement for effecting transport of sound motion-picture film through the camera along a predetermined path. A recording unit is operative for recording audio information onto the sound track of the motion-picture film. A suppressing device is automatically operative for preventing the recording of sound by the recording unit when the drive arrangement is being started up at the start of the filming of a scene and when the drive arrangement is being stopped at the end of the filming of a scene, to prevent the recording on the sound track of noise and interference signals generated by the drive arrangement.

9 Claims, 2 Drawing Figures

SOUND MOTION-PICTURE CAMERA

BACKGROUND OF THE INVENTION

The invention relates to sound motion-picture cameras of the type provided with means for preventing the recording of audio information onto the sound track of the motion-picture film during certain time intervals.

Federal Republic of Germany Offenlegungsschrift 2,333,011 discloses a camera of this general type provided with means for suppressing the recording of sound on the film sound track when the camera is set into operation at the start of the filming of a scene. This serves to prevent the recording of noise and interference signals which are generated during start-up of the electric motor of the drive means for the film transport device, and also to prevent the recording of distorted sound signals during the time interval when the film speed is still building up to its rated value. This is accomplished in that camera by utilizing a field-effect transistor which initially diverts the audio signal from the recording head; thereafter, in order that the suppressing action end after the elapse of a certain time interval, use is made of a capacitor which charges up and after so doing renders the field-effect transistor nonconductive.

This known circuit makes for good sound recording quality, in that the transmission of noise signals and the recording of them onto the film sound track during the start of the filming of a scene are prevented. However, I have found that serious noise and interference signals are generated and that serious frequency distortions develop not only at the start of the filming of a scene, i.e., when the camera is set into operation, but also at the end of the filming of a scene. When the filming of a scene is to be terminated, the activating switch of the camera is released, causing the capstan drive motor to become de-energized and stop and causing the capstan idler roller to be retracted away from the capstan; the circuitry which performs these operations in response to release of the activating switch generates a considerable amount of noise which I find detracts from the quality of the sound recording.

SUMMARY OF THE INVENTION

It is a general object of the invention to avoid the aforedescribed difficulties and disadvantages of the known sound motion-picture camera, utilizing preferably only very simple means.

According to one advantageous concept of the invention, this is accomplished by utilizing a control arrangement operative for activating for a certain time interval a suppressing circuit which prevents the recording of sound. The control arrangement activates the suppressing circuit both when the camera is first set into operation at the start of the filming of a scene and also when the camera is being stopped at the end of the filming of a scene.

In this way, the aforedescribed interference and noise effects are avoided. The recording of sound does not actually begin until each time as the camera, including the transmission circuit of the recording means thereof, has been fully activated and the capstan drive motor has reached its rated speed. Likewise, the recording of sound is terminated before the film-advancing means for the sound recording head is deactivated, e.g., before the rotary speed of the capstan drive motor has begun to decrease from its rated value.

According to one advantageous concept of the invention, the suppressing means is controlled by a control arrangement of particularly advantageous and reliable operation, the control arrangement being comprised of a control motor whose operation determines the moments of initiation and termination of the operation of the suppressing means, with the operation of the control motor occurring in response to activation and release of the activating switch of the camera.

According to another advantageous concept of the invention, the control motor drives a contact disk. The contact disk is electrically conductive but has a electrically non-conductive portion serving to interrupt energization of the control motor. Three contact arms ride on the moving contact disk, with two of the contact arms being positioned in the path of movement of the electrically nonconductive portion of the disk. Depending upon whether the activating switch of the camera is in its unactivated or activated setting, one or the other of those two contact arms is connected to the source of electrical energy for the circuit. The third contact arm is connected in the current path of the control motor for energizing the same and is connected to the suppressing circuit for activating the latter.

Advantageously, the suppressing circuit is comprised of short-circuiting means which can be activated and deactivated by a control signal, the short-circuiting means serving when activated to short-circuit one of the components of the sound-recording circuit of the camera and thereby prevent the recording of audio information onto the film sound track.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
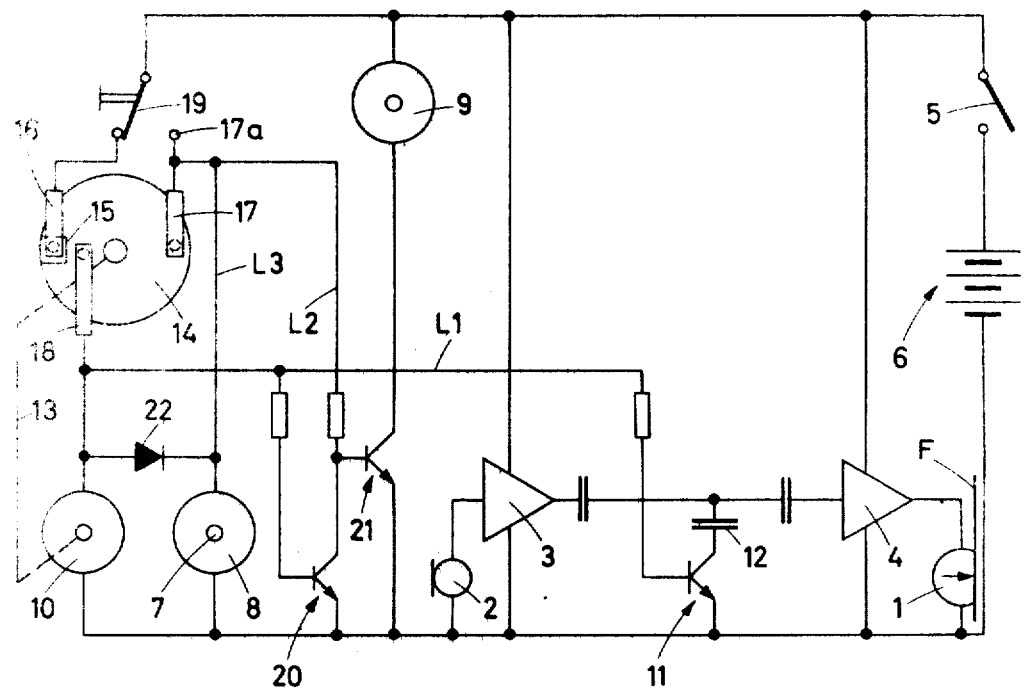
FIG. 1 depicts schematically the circuit of an exemplary sound motion-picture camera.

In FIG. 1, F denotes a motion-picture sound film having one or more sound tracks. When the drive mechanism of the camera is operative, the film F is moved past a sound recording head 1. Head 1 is the output element of a circuit operative for transferring onto the sound track of film F audio information picked up by means of a microphone 2. Besides elements 1 and 2, the recording circuit additionally includes two amplifier stages 3 and 4. These become activated in response to the closing of a main switch 5 on the (non-illustrated) camera by being connected to a current source 6.

The film F is continually driven past the sound recording location by a capstan 7. Capstan 7 is driven by a D.C. motor 8 energized by battery 6. A further motor 9, for example in cooperation with a non-illustrated film pull-down claw, effects intermittent transport of the film through the region of the aperture of the camera. Motor 9 is hereinafter referred to as the claw motor.

Provided in addition to motors 8 and 9, is a still further motor 10. Motor 10 forms part of a control arrangement described below. The control arrangement determines the duration of the operating interval of a suppressing circuit. The suppressing circuit when operative serves to prevent the transmission of audio information by the recording circuit at the beginning and at the end of a scene being photographed. In the illustrated embodiment, the suppressing circuit is essentially a short-circuiting stage comprised of a transistor 11 and a capacitor 12. The collector-emitter path of transistor 11 and capacitor 12 are connected in series with each other across the output of amplifier stage 3 of the recording circuit. When transistor 1 is conductive, its collector-emitter path diverts the output signal of amplifier stage 3 away from the input of amplifier stage 4.

The control motor 10 turns a control disk 14 through the intermediary of a transmission 13. The control disk 14 in the illustrated embodiment is a contact disk comprised of electrically conductive and non-conductive portions. The electrically non-conductive portion 15 serves, in a way described below, to interrupt the operation of control motor 10 when the control disk 14 reaches certain angular positions. Associated with contact disk 14 are three contact arms 16, 17, 18 which ride upon the surface of contact disk 14 as the latter turns. The two contact arms 16, 17 are located in the path of movement of the electrically non-conductive portion 15. Depending upon the setting of activating switch 19, one or the other of contact arms 16, 17 is switched into the current path of current source 6. Connected to the third contact arm 18 are the control motor 10 and, via conductor L1, the base of transistor 11 of the suppressing circuit. Also connected to conductor L1 is the base of a further transistor 20. The collector of transistor 20 is connected to the contact arm 17 via a conductor L2. Additionally connected to conductor L2 is the base of a switching transistor 21 for the claw motor 9 of the camera. The capstan drive motor 8 receives current via a conductor L3 when the activating switch 19 in the illustrated position of the control disk 14 will be brought into contact with a contact 17a. A diode 22 prevents current from flowing through conductor L3 into the control motor 10.

When the camera is set into operation, activating switch 19 engages the contact 17a associated with contact arm 17. The length of the time interval during which switch 19 remains in this activated setting depends upon the desired length of time for the scene being photographed. This time interval is designated $t_1$ in FIG. 2. When activating switch 19 assumes this activated setting, control motor 10 receives current via contact arm 17, contact disk 14 and contact arm 18, and accordingly the output shaft of motor 10 turns. The capstan drive motor 8 is connected to current source 6 via conductor L3, contact 17a and activating switch 19, and accordingly the output shaft of motor 8 turns, too.

Additionally, when activating switch 19 assumes the non-illustrated activated setting, positive potential is applied to the base of transistor 11 via conductor L1. As a result, transistor 11 becomes conductive, and its collector-emitter circuit diverts away from the input of amplifier stage 4 the output signal of amplifier stage 3. This turn-on of transistor 11 occurs abruptly simultaneously with the energization of capstan drive motor 8. Accordingly, the switch-on noise which is generated when the camera is first set into operation is not recorded onto the sound track of the film F, but instead is kept away from the input of amplifier stage 4 and from recording head 1 by means of the activated suppressing circuit arrangement 11, 12.

When transistor 11 is rendered conductive in this way, transistor 20 is likewise rendered conductive, as its base too is connected to conductor L1 and accordingly to positive potential. As a result, the transistor 21 in the current path of the claw motor 9 at first remains non-conductive; it remains non-conductive until such time as the contact disk 14 is turned by control motor 10 through an angle of 180° and assumes an angular position in which the electrically non-conductive portion 15 is in engagement with contact arm 17. The time interval during which transistor 21 remains non-conductive in this manner is denoted $t_2$ in FIG. 2.

As soon as the electrically non-conductive portion 15 moves beneath the contact arm 17, the supply of current to control motor 10 becomes interrupted, and the latter comes to a stop; the capstan drive motor 8, in contrast, continues to be connected to current source 8 via conductor L3 and accordingly continues to turn. Diode 22 prevents the energizing voltage for the capstan drive motor 8 from becoming applied to the control motor 10. A further consequence of the movement of portion 15 beneath contact arm 17 is that transistors 11 and 20 are rendered non-conductive. This is because the conductor L1 is now disconnected from the positive terminal of voltage source 6 by means of the electrically non-conductive portion 15. As a result of this, two things occur.

Figure 2:
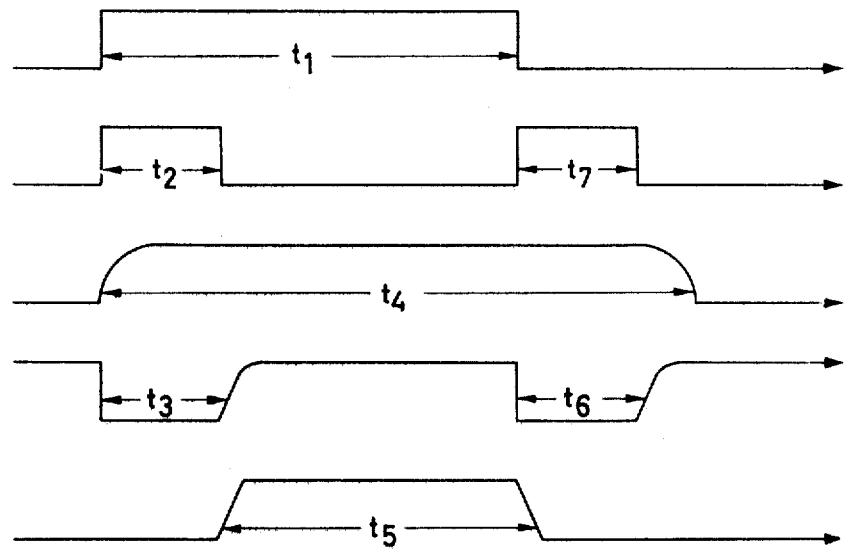
FIG. 2 depicts a signal diagram illustrating the commencement and termination of operation of each of several components of the camera circuit.

Firstly, the short-circuiting of the transmission circuit for the audio information, lasting for the time interval $t_3$ in FIG. 2, ends, so that the audio information after amplification in amplifier stage 4 can be recorded upon the sound track of the film F.

As can be seen in FIG. 2, the time interval $t_3$, during which the suppressing circuit arrangement is operative for suppressing the transmission of audio information, substantially coincides with the start-up phase of the capstan drive motor 8, the entire duration of whose operation is denoted by $t_4$ in FIG. 2, Secondly, the rendering non-conductive of transistor 20 results in a rendering conductive of transistor 21, as a consequence of which the claw motor 9 begins to operate. The latter operates for a time interval denoted by $t_5$ in FIG. 2.

When it is desired to terminate the filming of the scene at the end of time interval $t_1$, the activation switch 19 is released and it returns to its illustrated unactivated setting. As a result, current again flows to control motor 10 via components 19, 16, 14, 18 and the control motor 10 starts up. The capstan drive motor 8, hitherto energized via components 19, 17a, L3, is now energized via components 19, 16, 14, 18 and 22, and accordingly continues to operate. At the same time that control motor 10 becomes energized again, transistor 11 of the suppressing circuit is rendered conductive again and accordingly causes the suppressing circuit to be operative for the time interval $t_6$. Additionally, transistor 20 becomes conductive, thereby rendering switching transistor 21 non-conductive and interrupting the current path for the claw motor 9.

Upon the elapse of the time interval $t_7$, the contact disk 14 reaches again its illustrated starting position. As a result, the control motor 10 and likewise the capstan drive motor 8 are automatically turned off, because the electrically non-conductive portion 15 interrupts the flow of motor current via the components 16, 14, 18. As indicated in FIG. 2, the operative time interval $t_6$ of the suppressing arrangement commences while capstan drive motor 8 is still at its rated speed and before claw motor 9 begins to come to a stop. This assures that recording of audio information terminates before the capstan drive motor begins to slow down and in so doing generate noise and interference signals. The fact that the transmission circuit for the audio information becomes operative again during the capstan drive motor slow-down phase actually does not matter, because by the time the transmission circuit becomes operative again the claw motor has already been turned off and the film has therefore already come to a stop.

Instead of the device depicted in FIG. 1, the operation of the suppressing circuit could be controlled by an electronic control circuit, for example comprised of a flip-flop and/or a monostable multivibrator. However, the illustrated device has the advantage that, by means of the control motor 10, not only the contact disk 14 but additionally the components of the sound recording device which act mechanically upon the film, for example a pressure roller, can be readily adjusted if desired.

It will be understood that each of the elements described above, or two or more together, may also find a useful application in other types of circuits and constructions differing from the types described above.

While the invention has been illustrated and described as embodied in a motion-picture sound camera incorporating a plurality of drive motors, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a sound motion-picture camera, in combination, current source means for supplying operating voltage; drive means for effecting transport of sound motion-picture film through the camera along a predetermined path; recording means operative for recording audio information onto the sound track of the motion-picture film, the recording means including circuit means forming a transmission path for audio-information signals, connecting means connecting the current source means to the circuit means for applying to the latter operating voltage enabling the circuit means for transmission of audio-information signals through the transmission path, and controllable attenuating means connected in the transmission path and operative when activated for preventing recording of sound despite the enablement of the circuit means for transmission by attenuating the transmission of audio-information signals through the transmission path; and control means automatically operative for activating the attenuating means for a predetermined time interval both when the drive means is being started up at the start of the filming of a scene and also when the drive means is being stopped at the end of the filming of a scene.

2. The sound motion-picture camera defined in claim 1, the control means including a control motor, means for automatically effecting energization of the control motor for a predetermined time interval when the drive means is being started up and when the drive means is being stopped, and means for activating the attenuating means in dependence upon the operation of the control motor.

3. The sound motion-picture camera defined in claim 2, the camera including an activating switch operable for energizing the drive means, the means for automatically effecting energization of the control motor comprising means for effecting such energization in response to operation of the activating switch.

4. The sound motion-picture camera defined in claim 1, the camera including an activating switch operable for effecting energization of the drive means, the control means including a control motor, a control member coupled to and moved by the control motor when the latter is energized, means for effecting the initiation and termination of the energization of the control motor in dependence upon both the position of the control member and the setting of the activating switch, and means for effecting activation of the attenuating means in dependence upon the position of the control member and for thereafter effecting deactivation of the attenuating means in dependence upon the position of the control member.

5. The sound motion-picture camera defined in claim 1, the camera including an activating switch operable for energizing the drive means, the control means, a control motor a contact disk coupled to and driven by the control motor, the contact disk having electrically conductive and nonconductive portions, three contact arms riding on the contact disk, two of the contact arms being located in the path of movement of the electrically non-conductive portion, the activating switch having an activated and an unactivated setting in each of which it connects the current source means to a respective one of said two contact arms, the third contact arm being connected in the current path of the control motor for energizing the latter and being connected to the attenuating means for activating the same.

6. The sound motion-picture camera defined in claim 1, the attenuating means comprising controllable-conductivity means operative when activated for short-circuiting the signal-transmission path of one of the enabled components of the circuit means of the recording means.

7. The sound motion-picture camera defined in claim 6, the circuit means of the recording means including an audio signal amplifier, the controllable-conductivity means comprising means operative when activated for short-circuiting the output of the audio signal amplifier.

8. The sound motion-picture camera defined in claim 6, the controllable-conductivity means being comprised of an electronic switch element having a control electrode, the control means including means for activating the attenuating means by applying a control signal to the control electrode.

9. The camera defined in claim 5, the attenuating means being comprised of an electronic switch element having a current path connected to short-circuit the signal-transmission path of one of the components of the circuit means of the recording means when the shift element is conductive, the switch element having a control electrode connected to the third contact arm, a further electronic switch element connected in the current path of the drive means and having a control electrode connected to the third contact arm, the further electronic switch element serving to control the energization of the drive means.

* * * * *